United States Patent
Fripp et al.

(10) Patent No.: US 12,134,955 B2
(45) Date of Patent: Nov. 5, 2024

(54) EXTENDING THE LIFE OF DOWNHOLE RECHARGEABLE BATTERIES

(71) Applicant: Halliburton Energy Services, Inc., Houston, TX (US)

(72) Inventors: Michael Linley Fripp, Singapore (SG); Stephen Michael Greci, Little Elm, TX (US); Steven R. Hernandez, Jr., Houston, TX (US); Donald G. Kyle, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 22 days.

(21) Appl. No.: 18/193,268

(22) Filed: Mar. 30, 2023

(65) Prior Publication Data
US 2024/0328285 A1    Oct. 3, 2024

(51) Int. Cl.
*E21B 41/00*    (2006.01)
*H02J 7/00*    (2006.01)

(52) U.S. Cl.
CPC ........ *E21B 41/0085* (2013.01); *H02J 7/0047* (2013.01); *H02J 7/0063* (2013.01); *H02J 7/007182* (2020.01)

(58) Field of Classification Search
CPC .................................................. E21B 41/0085
See application file for complete search history.

(56) References Cited

U.S. PATENT DOCUMENTS 2,709,069 A * 5/1955 Boucher ................ E21B 25/16
324/377
4,210,017 A * 7/1980 Motsinger ................ G01L 5/24
702/41

(Continued)

FOREIGN PATENT DOCUMENTS

EP    3301252 A1    4/2018
NO    326317 B1    11/2008

OTHER PUBLICATIONS

Battery University—Lithium / Temperature—Accessed via WaybackMachine https://batteryuniversity.com/article/bu-808-how-to-prolong-lithium-based-batteries https://web.archive.org/web/20210718051237/https://batteryuniversity.com/article/bu-808-how-to-prolong-lithium-based-batteries (Year: 2021).*

(Continued)

*Primary Examiner* — David Carroll
(74) *Attorney, Agent, or Firm* — Kilpatrick Townsend & Stockton LLP

(57) ABSTRACT

Discharging a rechargeable battery in a wellbore may extend a lifetime of the rechargeable battery. A battery device positioned downhole in a wellbore may include a rechargeable battery for converting stored chemical energy into electrical power for powering a wellbore tool downhole. The battery device may also include a power source coupled to the rechargeable battery to charge the rechargeable battery. The battery device may include a controller that can discharge the rechargeable battery following a wellbore operation performed by the wellbore tool. The controller can monitor voltage levels of the rechargeable battery. The controller can further charge the battery cell prior to use of the wellbore tool if the voltage levels of the battery cell are below a discharged threshold.

20 Claims, 3 Drawing Sheets

(56) References Cited

U.S. PATENT DOCUMENTS

| | | | |
|---|---|---|---|
| 4,416,000 A * | 11/1983 | Scherbatskoy | E21B 47/22 |
| | | | 367/83 |
| 7,009,363 B2 | 3/2006 | Beals et al. | |
| 10,619,435 B2 | 4/2020 | Greci et al. | |
| 10,626,702 B2 | 4/2020 | Ornelaz et al. | |
| 11,066,904 B2 | 7/2021 | Fripp et al. | |
| 11,114,704 B2 | 9/2021 | Fripp et al. | |
| 11,391,132 B2 | 7/2022 | Arukhe et al. | |
| 2003/0048697 A1 | 3/2003 | Hirsch et al. | |
| 2005/0211436 A1* | 9/2005 | Fripp | E21B 36/00 |
| | | | 166/57 |
| 2008/0203734 A1 | 8/2008 | Grimes et al. | |
| 2015/0107824 A1* | 4/2015 | Signorelli | E21B 41/0085 |
| | | | 166/244.1 |
| 2016/0087271 A1 | 3/2016 | Jarvis et al. | |
| 2016/0090817 A1* | 3/2016 | Ramos | E21B 41/0085 |
| | | | 166/65.1 |
| 2016/0115782 A1 | 4/2016 | Martinez | |
| 2016/0237790 A1* | 8/2016 | Williams | E21B 47/18 |
| 2019/0010788 A1 | 1/2019 | Chu | |
| 2019/0058345 A1 | 2/2019 | Cooley et al. | |
| 2019/0323305 A1* | 10/2019 | Fripp | E21B 47/02 |
| 2020/0149372 A1* | 5/2020 | Hunter | E21B 41/0085 |
| 2021/0164346 A1* | 6/2021 | Jones | E21B 49/088 |

OTHER PUBLICATIONS

NL2037136, "Search Report", Jul. 25, 2024, 10 pages.
PCT/US2023/016920, "International Search Report and Written Opinion", Dec. 18, 2023, 17 pages.

* cited by examiner

EXTENDING THE LIFE OF DOWNHOLE RECHARGEABLE BATTERIES

TECHNICAL FIELD

The present disclosure relates generally to wellbore completion operations and, more particularly (although not necessarily exclusively), to extending the life of rechargeable batteries in wellbores via discharging.

BACKGROUND

A wellbore can be a hole drilled through a subterranean formation for extracting hydrocarbons from a reservoir. The subterranean formation may include a rock matrix permeated by oil or gas. A wellbore system may include wellbore tools that may utilize a power source to perform extraction operations. For instance, the wellbore tools may be powered by a power source such as a rechargeable battery device. Battery-powered wellbore tools may have limited lifespans due to limited charge capacity or degradation of rechargeable batteries due to the high-temperature and high-pressure environments present in wellbores.

DETAILED DESCRIPTION

Figure 1:
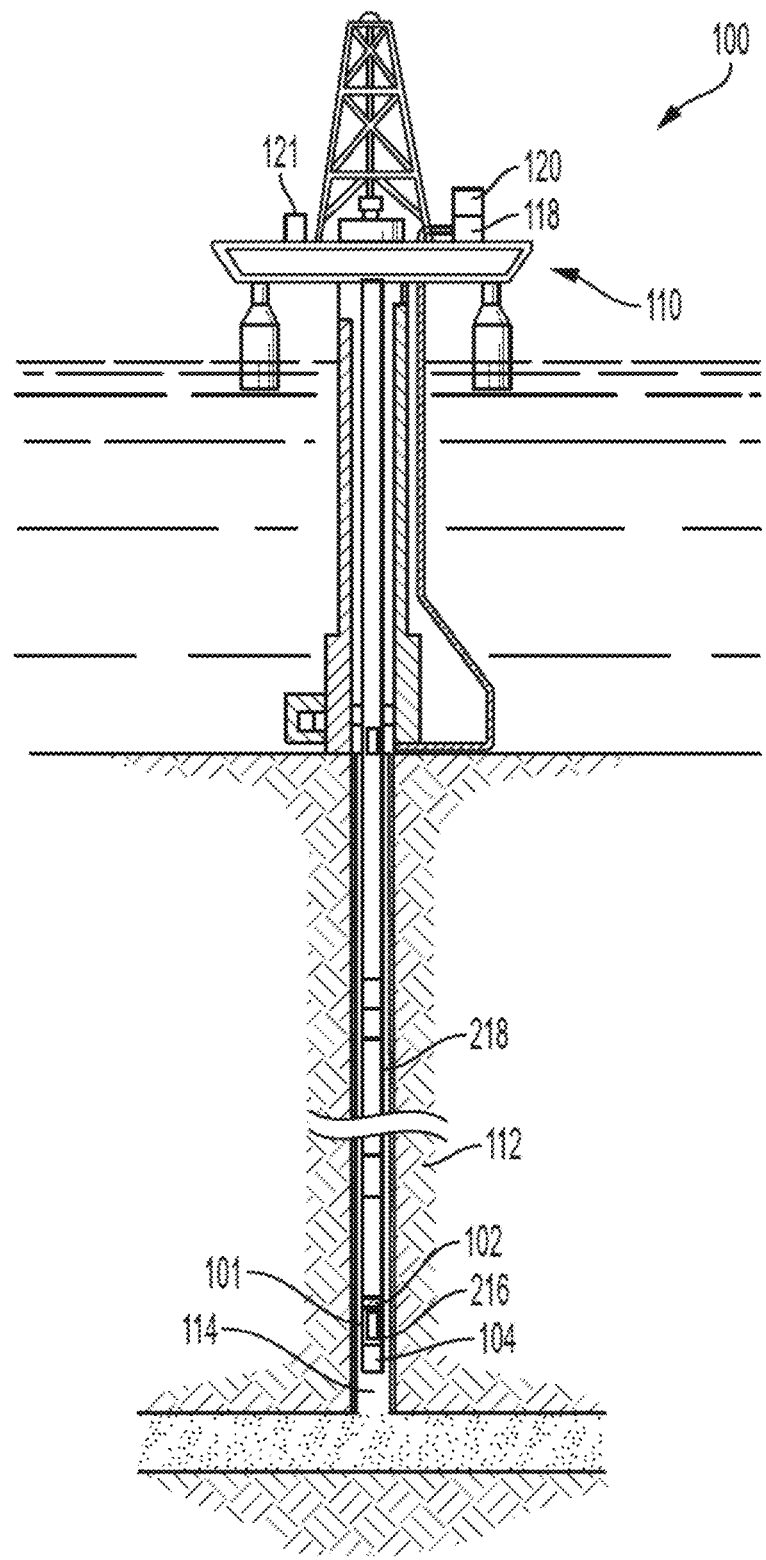
FIG. 1 is a schematic of a wellbore system including a rechargeable battery device for extending the lifetime of the rechargeable battery device according to one example of the present disclosure.

Certain aspects and examples of the present disclosure relate to extending the life of a rechargeable battery in a wellbore through discharging the battery. The wellbore may include a wide range of tools and technologies. Such tools can be powered downhole using rechargeable batteries. Extending a lifetime length of the rechargeable battery may be useful for performing wellbore operations. The lifetime of the rechargeable battery may be extended by maintaining the rechargeable battery in a discharged condition when not in use by wellbore tools. In some examples, the rechargeable battery may be actively discharged after the wellbore tool has finished a wellbore operation.

In many cases, rechargeable batteries may have a limited charge-cycle life. Rechargeable battery degradation may correlate with temperature, leading to lower charge potentials in subsequent charge cycles. For instance, rechargeable batteries can have a propensity to degrade when exposed to high temperatures in the wellbore (e.g., temperatures between 80° C. and 200° C.), while also being stored in a charged condition (e.g., in a voltage greater than 3.6 volts per battery cell). Over time, charge capacity may be lost when a rechargeable battery is stored or maintained in a combination of high temperatures and at charged voltages even while not being actively charged or discharged. Degradation within the rechargeable battery device, particularly the battery cell, can be much quicker at higher temperatures (greater than 80° C.) than at lower temperatures (lesser than 80° C.). Thermoelectrical degradation may lead to an electrochemical reaction within the battery cell that causes the charge capacity of the battery cell to be reduced.

For instance, a lithium-ion rechargeable battery device can permanently lose 1% of charge capacity per day at 100° C. The same battery device can permanently lose approximately 5% of its charge capacity per day at 122° C. Loss of capacity, however, may generally occur more quickly when the battery cells within the rechargeable battery device are in a charged condition. Conversely, when storing and maintaining a rechargeable battery in a discharged condition, despite wellbore temperatures, the battery cells within the rechargeable battery may experience very little chemical or thermoelectrical degradation.

Despite thermoelectrical degradation, storing and maintaining the rechargeable battery device downhole in low to moderate temperatures (e.g., 15-30° C.) may not be a plausible feat due to the high temperatures in the wellbore (greater than 80° C.). However, the rechargeable battery device can be stored with reduced voltage, or in a discharged condition to ameliorate the effects of thermoelectrical degradation. In one example, discharging the rechargeable battery device post operation may extend the life of the rechargeable battery device by minimizing temperature-induced loss of charge capacity. Typically, without actively discharging a battery, a one cell, 3.7-volt lithium-ion battery may be stored for up to 2 years. In one example, discharging the lithium-ion battery may extend the life of the battery by 5 years. In another example, discharging the lithium-ion battery device may extend the life of the battery by 15 years.

During battery storage at high temperatures, at times the wellbore tool may not be in operation, and the rechargeable battery device may therefore be stored in a discharged condition during those times. The rechargeable battery device stored in the discharged condition may only then be charged when the rechargeable battery device is needed to power the wellbore tool. Doing so may increase a number of charge-discharge cycles on the rechargeable battery device. In one example, an intermittently used tool may be a good candidate for the rechargeable battery device. For instance, the tool may not require a consistent source of energy to power the tool. Thereby, the rechargeable battery device powering the tool can be maintained and stored for prolonged periods of time in the discharged condition. In other examples, a consistently used tool may be a good candidate for the rechargeable battery device. For instance, a tool with consistent use may benefit from an extended battery lifetime that discharging batteries can provide. This is particularly true for a rechargeable battery that includes multiple battery cells. A first battery cell can power the tool while the other battery cells are maintained in a discharged condition. Then, when the first battery cell has been discharged by powering the tool, a second battery cell can be used to power the tool. And, the first battery cell can be stored in the discharged condition until the second battery cell has been discharged through use of the tool. In another example, a first rechargeable battery may power the tool until the charge capacity of the first rechargeable battery is significantly reduced. That is, the first rechargeable battery may be used to power the tool until charge for the first rechargeable battery is depleted. Subsequently, a second rechargeable battery may be charged, and the tool may then be powered by the second rechargeable battery. In some examples, the second rechargeable battery may be defined as a secondary battery. Maintaining batteries or battery devices in a discharged condition when energy is not needed may minimize thermal damage and degradation to the batteries. In some batteries, particularly lithium-metal battery cells and molten salt cells, thermoelectrical degradation can be avoided or significantly reduced.

In addition to thermoelectrical degradation, rechargeable batteries may also degrade from time and charge cycling. Time degradation may occur when a charge potential, or charge capacity, of the battery cell is lost due to electron equilibration. Over time, the voltage of the battery cell may approach zero when electrons and ions approach equilibrium in the battery cell. This process can be spontaneous, leading to the death of the battery cell. Discharging the rechargeable battery device can extend the life of the battery cell because an age-related capacity loss can be due to an electrochemical process. For example, reducing the voltage can serve to reduce an electrical drive in the electrochemical reactions.

Time-at-temperature may also subject the battery to thermoelectrical degradation through a build-up of the solid-electrolyte interface. Thermoelectrical degradation of a battery cell can manifest as an increase in solid electrolyte interfacial resistance of the electrodes. For example, the solid-electrolyte interface can be a passivation layer formed on a surface of an anode of a battery cell produced by electrolyte decomposition. As an example, a battery cell with a lithium metal anode and a lithium-nickel ($LiNi_{0.94}Co_{0.06}O_2$) cathode stored for 18 months may result in a 30 µm interface layer formed when fully discharged. In another example, storing the battery cell at 50% charge may lead to a 40 µm interface layer formation. Yet, in another example, storing the battery cell at 100% charge may lead to a 53 µm interface layer formation with visible dendritic formation. In another example, in lithium metal batteries with a liquid electrolyte, thermoelectrical degradation can occur due to dendrite degradation mechanisms. Dendrite nucleation can occur due to inhomogeneities in the electrolyte. A rate of dendrite formation can be faster at higher voltages and at higher temperatures. At lower cell voltages, dendrite formation can likely be reversible.

A charge cycle, also referred to herein as a cycle, can be described as a complete discharge of a battery cell followed by a full charge of the same battery cell. In one example, cycle-based battery degradation, or cycle degradation, may be addressed by adding a greater number of battery cells in the rechargeable battery device. Additional battery cells in the rechargeable battery device may relieve each battery cell from cycle-based battery degradation; each battery cell can experience fewer or shallower cycles. Alternatively, because more battery cells are likely to experience similar thermo-electrical-based battery degradation over time, in one example, additional uncharged battery cells may be added to the rechargeable battery device. The battery device may switch or alternate between the additional battery cells. The additional battery cells may be maintained in a discharged condition. In one example, the additional battery cells can be maintained in an unused, discharged condition for 5-15 years. A controller can receive instruction to charge one or more discharged battery cells prior to use and prior to the rechargeable battery device switching from a dead battery cell to a discharged battery cell. Innovative operating procedures for battery devices may minimize battery degradation, especially that which occurs from time-at-temperature. In one example, a battery cell is considered to be a dead battery cell when the full capacity of the cell is less than 60% of the full capacity of the original cell. In other examples, a dead battery cell can be defined by less than 80% or less than 40% of the original cell capacity.

Maintaining the rechargeable battery device in the discharged condition can be defined as ensuring the state-of-charge of the battery is maintained between 0%-40% and does not drop below 0%. This state-of-charge can be maintained by periodically delivering electrical energy from the power source to the battery cell to counteract a potential for self-discharge. Additionally, keeping the rechargeable battery device in the discharged condition can use less electrical power during storage. The potential for self-discharge of the battery device may be higher when the battery device is in a higher voltage state (e.g., in a charged condition). Maintaining the rechargeable battery device in a lower voltage state (e.g., in a discharged condition) may result in less energy or electrical power lost through self-discharge. In one example, a lithium metal rechargeable battery can retain more than 80% of its original full cycle capacity when stored at 3.6 volts for 1 year at 150° C. Storing the same battery in a fully charged condition of 4.0 volts may result in the rechargeable battery having 0% of its original full cycle capacity after the same amount of time elapsed.

In one example, a discharged condition can be defined as a state in which one or more battery cells of the rechargeable battery device are in a state-of-charge of less than 20% of a total charge capacity but above 0%, with the battery cells retaining less than 10% of its total capacity. An uncharged condition may be defined as a state in which the one or more battery cells are in a state-of-charge of less than 50%. Conversely, a charged condition can be a state in which the one or more battery cells are at, or greater than 60% of the battery cells total charge capacity with the battery cells retaining more than 90% of its total capacity (in Watt-hours). Because battery cells may lose a percentage of their total charge capacity over time, a charged condition can also be defined as a state-of-charge percentage greater than 60% where total charge capacity lost is not in excess of 10%. In some examples, the rechargeable battery device may be stored in a discharged condition for a majority of its time in the wellbore. In one example, a battery can be maintained in a discharged condition for greater than 90% of its operating life downhole.

In one example, the state-of-charge of a battery cell can be approximated by measuring the open-circuit voltage of the battery or by measuring the closed-circuit voltage of the battery. Alternatively, the state-of-charge can be approximated by measuring an internal resistance of the battery. The voltage of the battery cell may inversely correlate with the resistance of the battery cell where both can be used to approximate the state-of-charge of the battery. For example, a high internal resistance may indicate a lower closed-circuit battery voltage. Therefore, measuring the internal resistance of the battery for approximating the state-of-charge of the battery can serve as an alternative to measuring the voltage of the battery for approximating the state-of-charge.

The controller may be electrically coupled with the rechargeable battery device to monitor battery health metrics including charge capacity, charge-cycle life, and state-of-charge. Examples of the controller can include control electronics and control circuitry, each electrically coupled with the rechargeable battery device. Additionally, the controller, or control electronics, may receive instructions from a control system to discharge one or more rechargeable battery cells following operation of the wellbore tool. For example, the controller may discharge the battery cells into a load resistor where the energy may be converted into and dissipated as heat. Before operation of the wellbore tool, if the battery is in a discharged condition, the controller may also receive instructions to charge the one or more battery cells prior to use.

In other examples, the wellbore tool may include more than one rechargeable battery device. The wellbore tool may be charged by one or more rechargeable battery devices simultaneously according to energy requirements of the wellbore tool. In other examples, the wellbore tool may include more than one rechargeable battery devices as a method for providing additional or backup power, such that an operation of the wellbore tool is not interrupted. For instance, the wellbore tool may have two rechargeable battery devices, a first battery pack and a second battery pack. The wellbore tool may be deployed with both the first and the second battery pack; the first battery pack being in a charged condition and the second battery pack being in a discharged condition. The controller, positioned within the rechargeable battery device, may determine health metrics of the first and second battery packs. The controller may determine that the first battery pack has reached a terminal point at which the first battery pack is no longer usable. This can be done by detecting chemical or thermoelectrical degradation within the battery pack. The controller may receive a command from the wellbore tool to charge the second battery pack and switch a power supply of the wellbore tool to the second battery pack. Because the second battery pack was stored and maintained in a discharged condition, by the time the second battery pack is activated, it will have suffered less thermoelectrical damage and degradation than it otherwise may have experienced if the second battery pack were charged for storage. The wellbore tool may then avoid resurfacing for a battery swap such that operation of the wellbore tool is not interrupted.

Degradation of the first battery pack can be determined by the controller by how the capacity of the battery changes over time. Alternatively, degradation can be measured by the amount of current needed to keep the battery packs at a desired state-of-charge (a measure of self-discharge). Additionally, the controller may receive instruction to switch battery packs after a predetermined period.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellbore system 100 including a rechargeable battery device 102 for extending the lifetime of the rechargeable battery device according to one example of the present disclosure. In this example, the wellbore system 100 is depicted as a well, such as an oil or gas well, for extracting fluids from a subterranean formation 112.

The wellbore system 100 can include one or more downhole tools including a wellbore tool 104. The wellbore tool 104 can be any tool used to gather information about the wellbore, contents of the wellbore, or tool data. Examples of a wellbore tool can include, although are not limited to, completion tools, packers, plugs, drills, cleaning systems, and inspection devices, all of which may involve devices or actuators operated by the rechargeable battery device 102. Additionally, the wellbore tool 104 and other downhole devices may be powered by an up-hole rechargeable battery 118, or an up-hole power source 120, tethered to a surface of the wellbore. The wellbore tool 104 may be positioned within or delivered by a wireline or tubing string 218. Long-lasting rechargeable batteries may be helpful for an all-electric permanent completion. The rechargeable battery device 102 may be useful for load-leveling on wired completion or for wireless installation.

The wellbore tool 104 powered by the rechargeable battery device 102 can be a tool for measuring, wireline logging, logging-while-drilling, or another operation. The wellbore tool 104 can also be used for gathering data. Examples of data that can be gathered by a wellbore tool can include standpipe pressure, depth, mud flow in, torque, temperature, pressure, fluid composition, magnetic field, equivalent circulation density, or other parameters. The wellbore tool 104 can be powered and operated with energy from the rechargeable battery device 102. The rechargeable battery device 102 can include control electronics, or a controller 101, for transmitting or receiving information and instructions from a computer system 121 communicatively coupled up-hole. In other examples, the controller 101 may be used to send a wireless signal to set a packer, set an actuator, shift a baffle seat, and other suitable wellbore operations. A wellbore operation can include receiving or transmitting information, such as a command, a sensor reading, a state of health, or an acknowledgement of information receipt.

The rechargeable battery device 102 can be charged to power an actuator to operate one or more wellbore tools downhole. In one example, the rechargeable battery device 102 can be charged using the up-hole power source 120. In another example, the rechargeable battery device 102 can be charged using a downhole power source 216. The downhole power source 216 may include a flow-driven generator, a vibrating power generator, or a trickle charger. Following operation of the wellbore tool 104, the controller 101 may receive instructions from the computer system 121 to discharge the rechargeable battery device 102 to a discharged condition and to maintain the discharged condition. For example, the controller 101 can discharge the rechargeable battery device 102 until a voltage of the rechargeable battery device 102 is below an upper voltage limit of a state-of-charge for the discharged condition. In one example, the energy discharged by the rechargeable battery device 102 can be transferred to a resistor to dissipate energy in the form of heat. In another example, the energy may be dissipated in the form of heat. In some examples, the controller 101 may also prevent the downhole power source 216 from charging the battery cell. In other examples, the controller 101 may maintain the battery cell in the discharged condition following operation of the wellbore tool 104 by causing the downhole power source 216 to periodically apply voltage to the rechargeable battery device 102. This can prevent the rechargeable battery device 102 from having a voltage that is lower than a lower voltage limit of the state-of-charge for the discharged condition.

Prior to use of the wellbore tool 104, the computer system 121 may provide the controller 101 with instruction to charge the rechargeable battery device 102 such that the wellbore tool 104 can be powered and operated. One such example of the rechargeable battery device 102 is depicted in FIG. 2.

Figure 2:
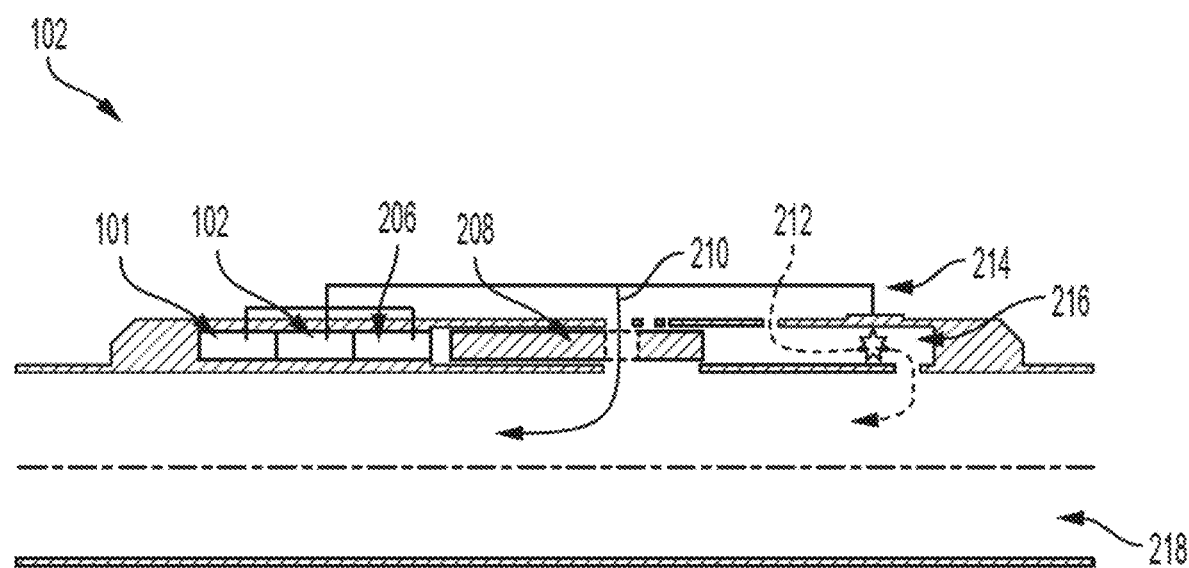
FIG. 2 is a cross-section of a tubing string including a rechargeable battery device for powering a wellbore tool with an actuator according to one example of the present disclosure.

FIG. 2 is a cross-section of the tubing string 218 including a rechargeable battery device 102 for powering the wellbore tool 104 with an actuator 206 according to one example of the present disclosure. In FIG. 2, the tubing string 218 can be used for transporting gas, fluids, or relevant wellbore items up or down the wellbore. The wellbore tool 104 can be positioned on an exterior of the tubing string 218 and can be used to adjust a flow restriction of gas or fluid into the tubing string 218. The wellbore tool 104 can be powered by the rechargeable battery device 102 to operate the actuator 206.

The actuator can be powered to move sleeve 208 over an opening in the tubing string 218 to limit or access a fluid flow path 210.

The controller 101 can receive a command to operate the actuator 206. Further, the controller 101 can charge the rechargeable battery device 102 when the device is below a charge threshold or if the wellbore tool 104 is to be powered by the rechargeable battery device 102. Following operation of the wellbore tool 104, the controller 101 may discharge the rechargeable battery device 102 such that the rechargeable battery device 102 is below a charge threshold and in a discharged condition. The controller 101 may receive instruction to maintain the rechargeable battery device 102 in a discharged condition for a predefined period of time or until the wellbore tool 104 is in operation. The controller 101 can determine when the actuator 206 will be needed. For example, the controller 101 can receive a digital command, such as a wireless signal from a wellbore surface 110, to adjust a valve position of the actuator 206. Alternatively, a wired signal from the surface can be sent to adjust the valve position. In other examples, the controller 101 can calculate a desired valve position based on a sensor reading, such as restricting flow as a fluid flow increases or decreases.

The rechargeable battery device 102 may be powered by the downhole power source 216. In this example, the downhole power source 216 can harvest energy from its natural surroundings. The downhole power source 216 can be a fluid-driven power generator such as a turbine. Such a fluid flow 212 may flow into the tubing string 218 and can be used for generating energy in the downhole power source 216. The downhole power source 216 can deliver energy to power the rechargeable battery device 102 through an electronic connection 214. The downhole power source 216 may also be nuclear power source or a conductor (TEC) that extends up the wellbore.

In one example, the rechargeable battery device 102 may be composed of solid-state or a liquid, electrolyte-state metal. The rechargeable battery device 102 may include more than one battery cell. Each battery cell may include one cathode and one anode. The cathode and anode may be composed of a combination of metals that may include at least one of lithium, copper, silver, nickel, boron, carbon, sulfur, alkali metals, alkaline earth metals, or other suitable elements.

Figure 3:
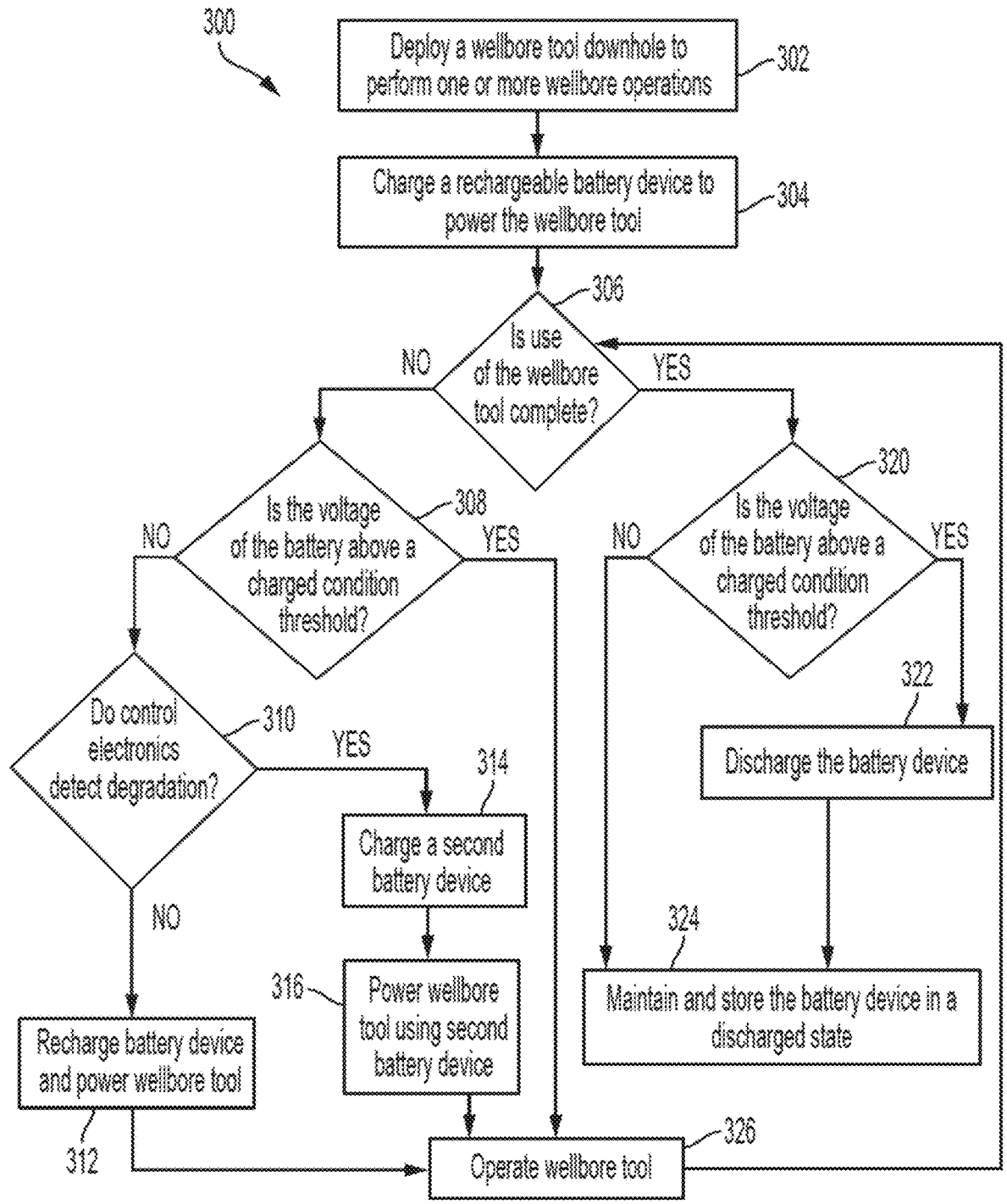
FIG. 3 is a flowchart of a process for discharging a rechargeable battery device to extend lifetime of the battery according to one example of the present disclosure.

FIG. 3 is a flowchart of a process 300 for discharging the rechargeable battery device 102 to extend lifetime of the battery according to one example of the present disclosure. In block 302, the wellbore tool 104, powered by the rechargeable battery device 102, is deployed downhole to perform one or more wellbore operations. The wellbore tool 104 can be a tool delivered downhole by wireline, such as in a wireline formation testing ("WFT") process. The wellbore tool 104 may be used for measuring wellbore tool 104 or wellbore content metrics.

In block 304, the rechargeable battery device 102 is charged to power the wellbore tool 104. In some examples, the rechargeable battery device 102 may be wired separately from the wellbore tool 104, and therefore can be tethered up-hole on the wellbore surface 110. In other examples, the wellbore tool 104 can include the rechargeable battery device 102 as an internal component of the wellbore tool 104. The rechargeable battery device 102 can be optionally charged before or after deployment of the wellbore tool 104 downhole. In some examples, the rechargeable battery device 102 may be in a discharged condition prior to use of the wellbore tool 104. The rechargeable battery device 102 can be charged via the downhole power source 216, such as a turbine. The controller 101 may establish electrical connection between the rechargeable battery device 102 and the downhole power source 216.

In block 306, the controller 101 can determine if use of the wellbore tool 104 complete. If use of the wellbore tool 104 is not complete, the process 300 can continue to block 308. If use of the wellbore tool 104 is complete, the process 300 can continue to block 320.

In block 308, if use of the wellbore tool 104 is not complete, the controller 101 can determine if the voltage of the battery is above a charged condition threshold. If the voltage of the battery is above a charged condition, the process 300 can continue to block 326. If the voltage of the battery is not above a charged condition, the process 300 can continue to block 310. A charged or discharged condition of a battery can be identified by the battery's state-of-charge relative to its cycle capacity. The controller 101 can also be in electronic communication with the downhole power source 216 to gather information on generated power. For example, the controller 101 can identify, based on the voltage of the battery cells of the rechargeable battery device, whether a battery is in a charged condition or not. In one example, the charged condition of the rechargeable battery device 102 can be defined as the battery cells of the rechargeable battery device 102 having a state-of-charge between 40% and 100%. Additionally, the cycle capacity for the same rechargeable battery device 102 may have greater than a 60% cycle capacity remaining stored in the battery cell. A subclass of the charged condition may be a fully charged condition where the battery cell has greater than 85% of the cycle capacity remaining. A subset of fully charged may be 100% charged. For example, the rechargeable battery device 102 may surpass a voltage threshold per battery cell that may indicate a 50% state-of-charge with a 65% cycle capacity; therefore, the rechargeable battery device 102 can be in a charged condition. In other examples, the rechargeable battery device 102 may be in a charged condition if the state-of-charge is within a range of 40-50%. In some examples, the rechargeable battery device 102 may be in a charged condition if the state-of-charge is within a range of 50-60%, 60-70%, 70-80%, 80-90%, or 90-100%. Additionally, the rechargeable battery device 102 may be in a charged condition if the state-of-charge is within a range of 45-55%, 55-65%, 65-75%, 75-85%, 85-95%, or 95-100%.

Alternatively, the voltage of the rechargeable battery device 102 may be below a charged condition threshold (i.e., a discharged condition). In one example, the discharged condition of the rechargeable battery device 102 can be defined as the battery cells of the rechargeable battery device 102 having a state-of-charge of less than 40% but greater than 0%. In some examples, the discharged condition can include a cycle capacity of less than 15%. In other examples, the discharged condition can include a cycle capacity or a state-of-charge of 0%. The state-of-charge can be determined by measuring an amount of charge that has passed through the battery cell, such as a number of coulombs or a number of amp-hours. For example, the rechargeable battery device 102 may be below a voltage threshold per battery cell that may indicate a 30% state-of-charge; therefore, the rechargeable battery device 102 can be considered as being in a discharged condition. In some examples, the rechargeable battery device 102 may be in a discharged condition if the state-of-charge is within a range of 30-39%, 20-30%, 10-20%, or 0-10%. Yet in other examples, the rechargeable battery device 102 may be in a discharged condition if the state-of-charge is within a range of 35-39%, 25-35%, 15-25%, 5-15%, or 0-5%. If the voltage of the battery is above the charge condition threshold, the process 300 can continue to block 326. If the voltage of the battery is not above the charge condition threshold, the process 300 can continue to block 310.

In block 326, the wellbore tool 104 may be operated. The controller 101 can determine a voltage level of the rechargeable battery device 102. The wellbore tool 104 may be operated until use of the wellbore tool 104 is complete.

In block 310, the controller 101 may detect degradation in the rechargeable battery device 102. If the controller 101 detects degradation, the process 300 can continue to block 314. If the controller 101 detects no degradation, the process 300 can continue to block 312. Degradation can be chemical, electrical, thermal, or any other types of degradation that can lead to a loss of cycle capacity or state-of-charge. Chemical degradation may occur when elemental ions lose or gain electrons, leading to improper balance of ions. Thermoelectrical degradation, similar to chemical, may occur if one or more battery cells are stored and maintained at or above a charged voltage threshold. Maintaining a battery in a charged threshold may lead to loss of cycle capacity over time. In some cases, batteries can encounter thermoelectrical degradation in a wellbore environment due to high temperatures. Thermoelectrical degradation may lead to loss of cycle capacity over time. In many cases, a combination of two or more above factors may limit a lifetime of a battery. The controller 101 can detect degradation of the rechargeable battery device 102 through monitoring state-of-charge, cycle capacity, time to reach a certain state-of-charge, as well as other suitable parameters. If the controller 101 detects degradation, the process 300 can continue to block 314. If the controller 101 does not detect degradation, the process 300 can continue to block 304.

In block 314, if the controller 101 detects degradation, a second rechargeable battery device may be charged. The second rechargeable battery device may be stored and maintained in the discharged state until use is needed. The second rechargeable battery device may be stored proximally to the first rechargeable battery device. The second rechargeable battery device may also be powered by the downhole power source 216 or the up-hole power source 120. Upon the controller 101 detecting degradation, be it chemical, electrical, or otherwise any form of degradation, the controller 101 may switch the power supply of the wellbore tool 104 from the first rechargeable battery device 102 to the second rechargeable battery device. In some examples, the wellbore tool 104 may include more than two rechargeable battery devices. The wellbore tool 104 may include 3, 4, 5, 6, 7, 8, or more, rechargeable battery devices that can be used as backup when the controller detects degradation such that wellbore tool 104 operation is not interrupted.

In block 316, the wellbore tool is powered using the second battery device. The controller 101 may switch the wellbore tool 104 to the second rechargeable battery device for powering the wellbore tool 104 following charging of the second battery device. The second rechargeable battery device may have been stored and maintained in the discharged state such that a charge capacity was not lost or degraded over time-at-temperature. Further, the controller 101 may switch to the second battery device before the first rechargeable battery device 102 completely degrades and dies such that the wellbore tool 104 is consistently powered to prevent interruption of a wellbore operation. The controller can switch to the second battery cell or the second battery device if the first battery cell or rechargeable battery device has a cycle capacity of less than 50% of its original cycle capacity. The controller may also switch to the second battery device after a predetermined amount of time has passed. In one example, the predetermined amount of time may be 5 years, 10 years, 20 years, or 30 years.

In block 326, the wellbore tool 104 may be operated until use of the wellbore tool 104 is complete. In block 320, the controller 101 can determine if the voltage of the battery is above a charged condition threshold. If the voltage of the battery is above the charged condition threshold, the process 300 can continue to block 322. If the voltage of the battery is not above the charged condition threshold, the process 300 can continue to block 324. The voltage of the charged and discharged conditions can be described similarly to those conditions described in block 308.

In block 324, the rechargeable battery device 102 will be maintained and stored in the discharged condition. The rechargeable battery device 102 may be stored and maintained in the discharged condition until the wellbore tool 104 is next used. In block 322, the rechargeable battery device 102 is discharged. For example, the rechargeable battery device 102 can be discharged using a resistor. Alternatively or additionally, the controller 101 may allow the rechargeable battery device 102 to passively discharge energy. For example, the wellbore tool 104 may be used until the state-of-charge of the rechargeable battery device 102 becomes 0% prior to maintaining and storing the rechargeable battery device 102. Alternatively, the controller 101 may allow for the battery cells of the rechargeable battery device 102 to discharge energy through heat dissipation. Following the discharge of the rechargeable battery device 102 in block 322, the rechargeable battery device 102 may be maintained and stored until the wellbore tool 104 is next used.

In some aspects, a battery device, a system including the battery device, and a method for extending the life of a battery device through charging or discharging are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a battery device comprising: a rechargeable battery positionable downhole in a wellbore to power a wellbore tool downhole; a power source electrically couplable to the rechargeable battery to charge the rechargeable battery to a charged condition; and a controller communicatively couplable to the power source to prevent the power source from charging the rechargeable battery and to maintain the rechargeable battery in a discharged condition subsequent to completing a wellbore operation.

Example 2 is the battery device of example(s) 1, wherein the controller is configured to detect a voltage level of the rechargeable battery, wherein the controller is configured to receive a command to electrically couple the power source to the rechargeable battery to charge the rechargeable battery prior to use of the wellbore tool in response to detecting that a voltage level of the rechargeable battery is below a discharged threshold.

Example 3 is the battery device of any of example(s) 1-2, wherein the rechargeable battery is a first rechargeable battery, and wherein the battery device further comprises: a second rechargeable battery, wherein the controller is configured to electrically couple the second rechargeable battery to the power source to charge the second rechargeable battery to the charged condition in response to detecting that the voltage level of the first rechargeable battery is below the discharged threshold.

Example 4 is the battery device of any of example(s) 1-3, wherein the wellbore tool comprises an actuator that is couplable to a tubing string in the wellbore, and wherein the rechargeable battery is configured to power the actuator to perform the wellbore operation that comprises an actuation of the actuator.

Example 5 is the battery device of any of example(s) 1-4, wherein the controller is configured to maintain the rechargeable battery in the discharged condition subsequent to completing the wellbore operation by causing the power source to charge the rechargeable battery to maintain a voltage level of the rechargeable battery at a lower voltage limit of the discharged condition.

Example 6 is the battery device of any of example(s) 1-5, wherein the charged condition comprises a state-of-charge for the rechargeable battery that is greater than 40% of a cycle capacity for the rechargeable battery, and wherein the discharged condition comprises the state-of-charge for the rechargeable battery being between 0% and 40% of the cycle capacity for the rechargeable battery.

Example 7 is the battery device of any of example(s) 1-6, wherein the power source comprises a flow-driven generator, a vibrating power generator, or a trickle charger.

Example 8 is a method comprising: positioning a battery device in a wellbore, the battery device comprising a rechargeable battery to power a wellbore tool downhole; charging, by a power source electrically coupled to the rechargeable battery, the rechargeable battery to a charged condition; subsequent to charging the rechargeable battery to a charged condition, powering, by the battery device, the wellbore tool for use in a wellbore operation; subsequent to the wellbore operation, discharging, by a controller communicatively coupled to the power source and the battery device, the battery device to a discharged condition; and maintaining, by the controller, the rechargeable battery in the discharged condition subsequent to the wellbore operation.

Example 9 is the method of example(s) 8, wherein charging the rechargeable battery to a charged condition occurs in response to: detecting, by the controller, a voltage level of the rechargeable battery that is below a discharged threshold; and receiving a command, by the controller, to charge the rechargeable battery prior to use of the wellbore tool when the voltage level of the rechargeable battery is below the discharged threshold.

Example 10 is the method of any of example(s) 8-9, wherein the rechargeable battery is a first rechargeable battery, and wherein the method further comprises: in response to detecting that the voltage level of the first rechargeable battery is below the discharged threshold, detecting, by the controller, that a second rechargeable battery in the battery device has a voltage level that is below the discharged threshold; and in response to detecting that the second rechargeable battery has a voltage level that is below the discharged threshold, electrically coupling the second rechargeable battery to the power source to charge the second rechargeable battery to the charged condition.

Example 11 is the method of any of example(s) 8-10, wherein the wellbore tool is an actuator coupled to a tubing string in the wellbore, and wherein the method further comprises: powering, by the rechargeable battery, the actuator to perform the wellbore operation that comprises an actuation of the actuator.

Example 12 is the method of any of example(s) 8-11, wherein maintaining the rechargeable battery in the discharged condition further comprises: causing, by the controller, the power source to charge the rechargeable battery to maintain a voltage level of the rechargeable battery at a lower voltage limit of the discharged condition.

Example 13 is the method of any of example(s) 8-12, wherein the power source comprises a flow-driven generator, a vibrating power generator, or a trickle charger.

Example 14 is the method of any of example(s) 8-13, wherein the charged condition comprises a state-of-charge for the rechargeable battery that is greater than 40% of a cycle capacity for the rechargeable battery, and wherein the discharged condition comprises the state-of-charge for the rechargeable battery being between 0% and 40% of the cycle capacity for the rechargeable battery.

Example 15 is a system comprising: a tubing string positionable downhole in a wellbore; a wellbore tool coupled to the tubing string; a battery device electrically couplable to the wellbore tool for powering the wellbore tool, the battery device comprising: a rechargeable battery; a power source electrically couplable to the rechargeable battery to charge the rechargeable battery to a charged condition; and a controller communicatively couplable to the power source to prevent the power source from charging the rechargeable battery and to maintain the rechargeable battery in a discharged condition subsequent to completing a wellbore operation.

Example 16 is the system of example(s) 15, wherein the controller is configured to detect a voltage level of the rechargeable battery, wherein the controller is configured to receive a command to electrically couple the power source to the rechargeable battery to charge the rechargeable battery prior to use of the wellbore tool in response to detecting that a voltage level of the rechargeable battery is below a discharged threshold.

Example 17 is the system of any of example(s) 15-16, wherein the rechargeable battery is a first rechargeable battery, and wherein the battery device further comprises: a second rechargeable battery, wherein the controller is configured to electrically couple the second rechargeable battery to the power source to charge the second rechargeable battery to the charged condition in response to detecting that the voltage level of the first rechargeable battery is below the discharged threshold.

Example 18 is the system of any of example(s) 15-17, wherein the wellbore tool comprises an actuator that is couplable to the tubing string, and wherein the rechargeable battery is configured to power the actuator to perform the wellbore operation that comprises an actuation of the actuator.

Example 19 is the system of any of example(s) 15-18, wherein the charged condition comprises a state-of-charge for the rechargeable battery that is greater than 40% of a cycle capacity for the rechargeable battery, wherein the discharged condition comprises the state-of-charge for the rechargeable battery being between 0% and 40% of the cycle capacity for the rechargeable battery, and wherein the power source comprises a flow-driven generator, a vibrating power generator, or a trickle charger.

Example 20 is the system of any of example(s) 15-19, wherein the controller is configured to maintain the rechargeable battery in the discharged condition subsequent to completing the wellbore operation by causing the power source to charge the rechargeable battery to maintain a voltage level of the rechargeable battery at a lower voltage limit of the discharged condition.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A battery device comprising:
    a rechargeable battery positionable downhole in a wellbore to power a wellbore tool downhole;
    a power source electrically couplable to the rechargeable battery to charge the rechargeable battery to a charged condition; and
    a controller communicatively couplable to the power source to prevent the power source from charging the rechargeable battery and to maintain the rechargeable battery in a discharged condition subsequent to completing a wellbore operation, wherein the discharged condition comprises a state-of-charge for the rechargeable battery being between 0% and 40% of a cycle capacity for the rechargeable battery.

2. The battery device of claim 1, wherein the controller is configured to detect a voltage level of the rechargeable battery, wherein the controller is configured to receive a command to electrically couple the power source to the rechargeable battery to charge the rechargeable battery prior to use of the wellbore tool in response to detecting that the voltage level of the rechargeable battery is below a discharged threshold.

3. The battery device of claim 2, wherein the rechargeable battery is a first rechargeable battery, and wherein the battery device further comprises:
    a second rechargeable battery, wherein the controller is configured to electrically couple the second rechargeable battery to the power source to charge the second rechargeable battery to the charged condition in response to detecting that the voltage level of the first rechargeable battery is below the discharged threshold.

4. The battery device of claim 1, wherein the wellbore tool comprises an actuator that is couplable to a tubing string in the wellbore, and wherein the rechargeable battery is configured to power the actuator to perform the wellbore operation that comprises an actuation of the actuator.

5. The battery device of claim 1, wherein the controller is configured to maintain the rechargeable battery in the discharged condition subsequent to completing the wellbore operation by causing the power source to charge the rechargeable battery to maintain a voltage level of the rechargeable battery at a lower voltage limit of the discharged condition.

6. The battery device of claim 1, wherein the charged condition comprises the state-of-charge for the rechargeable battery being greater than 40% of the cycle capacity for the rechargeable battery.

7. The battery device of claim 1, wherein the power source comprises a flow-driven generator, a vibrating power generator, or a trickle charger.

8. A method comprising:
    positioning a battery device in a wellbore, the battery device comprising a rechargeable battery to power a wellbore tool downhole;
    charging, by a power source electrically coupled to the rechargeable battery, the rechargeable battery to a charged condition;
    subsequent to charging the rechargeable battery to the charged condition, powering, by the battery device, the wellbore tool for use in a wellbore operation;
    subsequent to the wellbore operation, discharging, by a controller communicatively coupled to the power source and the battery device, the battery device to a discharged condition, wherein the discharged condition comprises a state-of-charge for the rechargeable battery being between 0% and 40% of a cycle capacity for the rechargeable battery; and
    maintaining, by the controller, the rechargeable battery in the discharged condition subsequent to the wellbore operation.

9. The method of claim 8, wherein charging the rechargeable battery to the charged condition occurs in response to:
    detecting, by the controller, a voltage level of the rechargeable battery that is below a discharged threshold; and
    receiving a command, by the controller, to charge the rechargeable battery prior to use of the wellbore tool when the voltage level of the rechargeable battery is below the discharged threshold.

10. The method of claim 9, wherein the rechargeable battery is a first rechargeable battery, and wherein the method further comprises:
    in response to detecting that the voltage level of the first rechargeable battery is below the discharged threshold, detecting, by the controller, that a second rechargeable battery in the battery device has a voltage level that is below the discharged threshold; and
    in response to detecting that the second rechargeable battery has the voltage level that is below the discharged threshold, electrically coupling the second rechargeable battery to the power source to charge the second rechargeable battery to the charged condition.

11. The method of claim 8, wherein the wellbore tool is an actuator coupled to a tubing string in the wellbore, and wherein the method further comprises:
    powering, by the rechargeable battery, the actuator to perform the wellbore operation that comprises an actuation of the actuator.

12. The method of claim 8, wherein maintaining the rechargeable battery in the discharged condition further comprises:
    causing, by the controller, the power source to charge the rechargeable battery to maintain a voltage level of the rechargeable battery at a lower voltage limit of the discharged condition.

13. The method of claim 8, wherein the power source comprises a flow-driven generator, a vibrating power generator, or a trickle charger.

14. The method of claim 8, wherein the charged condition comprises the state-of-charge for the rechargeable battery being greater than 40% of the cycle capacity for the rechargeable battery.

15. A system comprising:
    a tubing string positionable downhole in a wellbore;
    a wellbore tool coupled to the tubing string;
    a battery device electrically couplable to the wellbore tool for powering the wellbore tool, the battery device comprising:
        a rechargeable battery;
        a power source electrically couplable to the rechargeable battery to charge the rechargeable battery to a charged condition; and
        a controller communicatively couplable to the power source to prevent the power source from charging the rechargeable battery and to maintain the rechargeable battery in a discharged condition subsequent to completing a wellbore operation, wherein the discharged condition comprises a state-of-charge for the rechargeable battery being between 0% and 40% of a cycle capacity for the rechargeable battery.

16. The system of claim 15, wherein the controller is configured to detect a voltage level of the rechargeable battery, wherein the controller is configured to receive a command to electrically couple the power source to the rechargeable battery to charge the rechargeable battery prior to use of the wellbore tool in response to detecting that the voltage level of the rechargeable battery is below a discharged threshold.

17. The system of claim 16, wherein the rechargeable battery is a first rechargeable battery, and wherein the battery device further comprises:
- a second rechargeable battery, wherein the controller is configured to electrically couple the second rechargeable battery to the power source to charge the second rechargeable battery to the charged condition in response to detecting that the voltage level of the first rechargeable battery is below the discharged threshold.

18. The system of claim 15, wherein the wellbore tool comprises an actuator that is couplable to the tubing string, and wherein the rechargeable battery is configured to power the actuator to perform the wellbore operation that comprises an actuation of the actuator.

19. The system of claim 15, wherein the charged condition comprises the state-of-charge for the rechargeable battery being greater than 40% of the cycle capacity for the rechargeable battery, and wherein the power source comprises a flow-driven generator, a vibrating power generator, or a trickle charger.

20. The system of claim 15, wherein the controller is configured to maintain the rechargeable battery in the discharged condition subsequent to completing the wellbore operation by causing the power source to charge the rechargeable battery to maintain a voltage level of the rechargeable battery at a lower voltage limit of the discharged condition.

\* \* \* \* \*